(12) United States Patent
Lin et al.

(10) Patent No.: US 11,941,339 B1
(45) Date of Patent: Mar. 26, 2024

(54) AUTOMATED EQUAL-RESISTANCE ROUTING IN COMPACT PATTERN

(71) Applicant: Synopsys, Inc., Mountain View, CA (US)

(72) Inventors: Linx Lin, New Taipei (TW); Alex Tsai, Taipei (TW); Hung-Shih Wang, Hsinchu County (TW)

(73) Assignee: Synopsys, Inc., Mountain View, CA (US)

( * ) Notice: Subject to any disclaimer, the term of this patent is extended or adjusted under 35 U.S.C. 154(b) by 212 days.

(21) Appl. No.: 17/679,679

(22) Filed: Feb. 24, 2022

Related U.S. Application Data

(60) Provisional application No. 63/154,637, filed on Feb. 26, 2021.

(51) Int. Cl.
*G06F 30/3953* (2020.01)
*G06F 30/394* (2020.01)
*G06F 30/3947* (2020.01)
*G06F 30/398* (2020.01)
*G06F 119/02* (2020.01)

(52) U.S. Cl.
CPC ........ *G06F 30/3953* (2020.01); *G06F 30/394* (2020.01); *G06F 30/3947* (2020.01); *G06F 30/398* (2020.01); *G06F 2119/02* (2020.01)

(58) Field of Classification Search
CPC .................................................... G06F 30/3953
USPC .......................................................... 716/126
See application file for complete search history.

(56) References Cited

U.S. PATENT DOCUMENTS 11,645,440 B1 * 5/2023 Bustany ................ G06F 30/392
716/102

* cited by examiner

*Primary Examiner* — Eric D Lee
(74) *Attorney, Agent, or Firm* — Haynes Beffel & Wolfeld LLP; Andrew L. Dunlap; Korbin S Van Dyke

(57) ABSTRACT

Described is technology for automatically generating a routing for an integrated circuit (IC) design. Information describing pin-pairs of an integrated circuit (IC) design is received. An initial routing of the IC design is determined by (i) defining connected wires between each pin-pair in the set of pin-pairs, and (ii) evaluating a target resistance for the pin-pair over the connected wires, wherein each connected wire is routed with other connected wires. A resistance adjustment is applied to adjust wire resistance of the connected wires of the initial routing. The resistance adjustment can be based on a square routing in response to a wire resistance being below the target resistance; or the resistance adjustment can be based on a multi-layer stacking in response to the wire resistance being above the target resistance. The routing is provided in patterns as generated by the initial routing and the resistance adjustment.

20 Claims, 19 Drawing Sheets

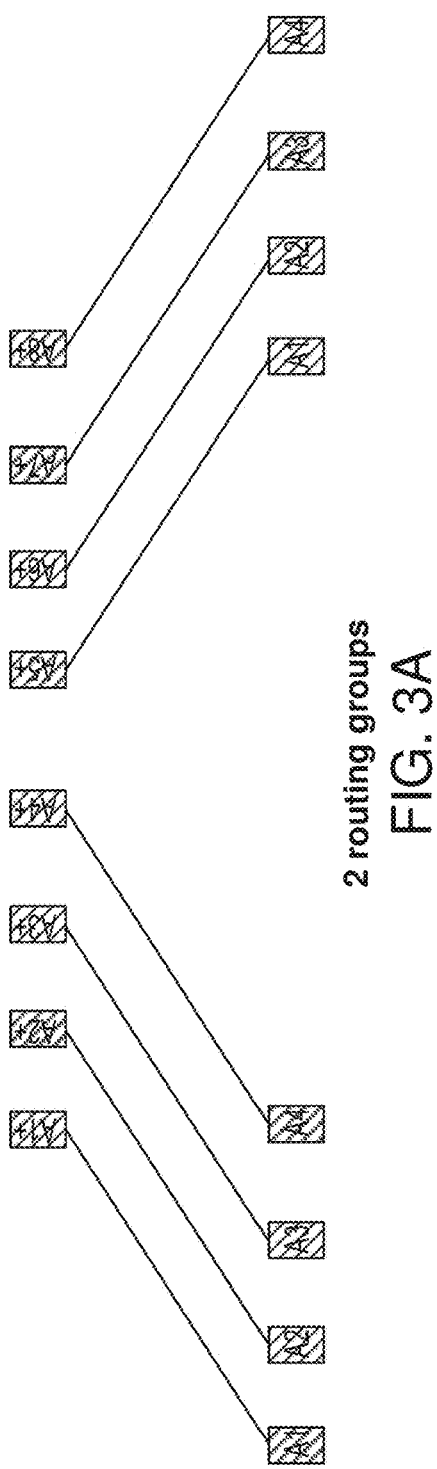
FIG. 3A 2 routing groups
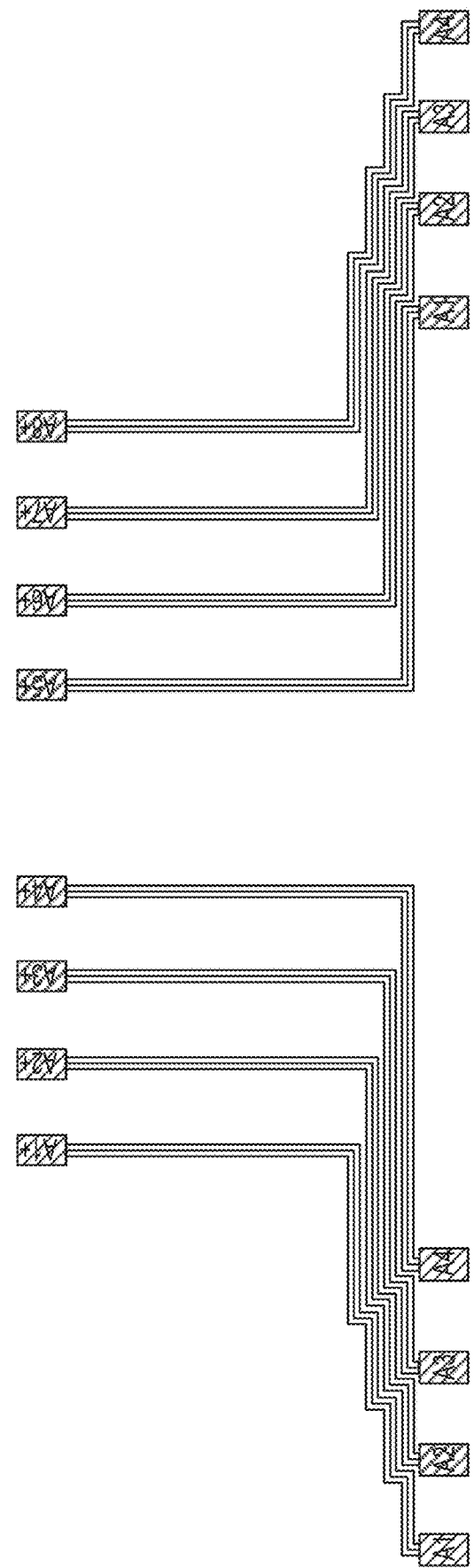
FIG. 3B the bundle routing results of FIG. 3A Stacking in 2 layers Stacking in 3 layers Evaluation of the initial routing result Adjusting wires to be equal-resistance Selecting (e.g., via user input) target resistance will change combination of techniques selected for the solution Table 1

| Metal Layer | Metal1 | Metal2 | Metal3 |
|---|---|---|---|
| Sheet Resistance | 0.21 Ω | 0.14 Ω | 0.145 Ω |

Table 2

| Benchmark | Pin-pair number | Wire width | Wire spacing | Max. R of single layer routing | Min. R of single layer routing | Ratio of Max. Min. Difference | Target Resistance |
|---|---|---|---|---|---|---|---|
| Case1 | 200 | 0.3 | 0.25 | 406.34 | 203.05 | 50% | 304.70 |
| Case2 | 1446 | 0.3 | 0.21 | 1263.75 | 211.36 | 83.3% | 737.56 |
| Case3 | 1926 | 0.21 | 0.26 | 1106.67 | 278.87 | 74.8% | 692.77 |

Table 3

| Benchmark | Target Resistance (?) | Max. Res. (?) | Min. Res. (?) | Ratio of Max. Min. Difference |
|---|---|---|---|---|
| Case1 | 304.70 | 305.43 | 304.07 | 0.445% |
| Case2 | 737.56 | 737.933 | 736.998 | 0.127% |
| Case3 | 692.77 | 693.754 | 691.977 | 0.256% |

FIG. 16

AUTOMATED EQUAL-RESISTANCE ROUTING IN COMPACT PATTERN

RELATED APPLICATION

This application claims priority under 35 U.S.C. § 119(e) to U.S. Provisional Patent Application No. 63/154,637, entitled "AUTOMATED EQUAL-RESISTANCE ROUTING IN COMPACT PATTERN" filed on Feb. 26, 2021, which application is incorporated herein by reference.

TECHNICAL FIELD

The present technology relates to electronic design automation and particularly to automating equal-resistance routing in compact patterns.

BACKGROUND

Integrated circuits (ICs) are fundamental components ubiquitously found in a wide variety of electronic devices, such as televisions, personal computers, mobile devices, and so on. An IC's design is comprised of a wide variety of active components and interconnecting wiring. Wire routing for the design can take into account a variety of factors, e.g., path resistance, impedances, and so forth in the layout of the connecting wires. For example, some Integrated Circuit components will exhibit desirable characteristics when the path resistance of wires connecting like components is similar or substantially similar. Display driver circuitry for a display unit, for example, having pixel pathways of similar resistance can result in a more even brightness in the display.

SUMMARY

The present technology provides systems, methods and computer program instructions implementing an automated flow to route wires in hardware designs compactly. Implementations can achieve routing solutions in which the resistances of routed wires are as nearly equal as possible.

In an aspect of the present technology a method for generating a routing for an integrated circuit (IC) design includes receiving information describing a set of pin-pairs of an integrated circuit (IC) design. Determining, by a processor, an initial routing of the IC design by (i) defining connected wires between each pin-pair in the set of pin-pairs, and (ii) evaluating a target resistance for the pin-pair over the connected wires, wherein each connected wire is routed with other connected wires is also part of the method. The method can also include determining, by the processor, after initial routing, a resistance adjustment to be applied to adjust wire resistance of the connected wires. The resistance adjustment can be based on a square routing in response to a wire resistance being below the target resistance. The resistance adjustment can be based on a multi-layer stacking in response to the wire resistance being above the target resistance. The method also includes providing the routing in patterns as generated by the initial routing and the resistance adjustment.

In another aspect of the present technology, determining an initial routing further includes compacting wires and routing wires in a consistent pattern. Compacting can be achieved by determining which wires should be in the same routing pattern, thereby forming groups of wires to be routed into the routing patterns; and for each group, routing wires in the group in bundles, wherein each wire in a bundle is routed in a same pattern.

In some implementations, routing groups are determined by position of start pin and end pin.

In a further aspect of the present technology, determining a square routing further includes routing a first segment according to a square wave pattern. Routing according to a square wave pattern can be achieved by (i) determining an amplitude of a unit square wave and (ii) obtaining an incremental resistance of the unit square wave. Determining an amplitude of a unit square wave can include: (i)(a) computing a distance between adjacent wires; (i)(b) determining a median of the distance computed; and (i)(c) providing the median as the amplitude. Obtaining an incremental resistance of the unit square wave can include: (ii)(a) computing a length of amplitudes of the wires in the square wave; and (ii)(b) determining, from a target resistance $R_{Target}$ and a resistance of a wire $R_{Wire}$, and an incremental resistance of a unit square wave $R_{Unit}$, a unit number representing a number of units of square waves needed.

In some implementations, determining a square routing further includes routing additional segments.

In a yet further aspect of the present technology, determining a multi-layer stacking for a wire can include (i) obtaining a quantity of metal layers needed for stacking the wire; (ii) forming a first resistor comprised of metal layers of the quantity obtained and a second resistor comprised of a single layer, wherein the second resistor is connected in series to the first resistor; and (iii) adjusting at least a length of the first resistor and the second resistor to approach the target resistance.

In some implementations, a multi-layer stacking can be determined for additional wires in a same group with the wire.

In some implementations, the number of connections between different layers is obtained using rules prompted for and received.

In a still yet further aspect of the present technology, the pin-pairs can include a voltage source from a display driver integrated circuit ("IC") and a corresponding pixel as two pins.

In a yet still further aspect of the present technology, text or shape (pin or rectangle) indicates what can be connected in the pin-pairs.

A system including one or more processors and memory accessible by the processors is also described. The memory can be loaded with computer instructions which can be executed on the processors. The computer instructions when executed on the processors can implement the method for generating an equal-resistance routing from information describing a set of pin-pairs. Computer program products which can be executed by computer systems are also described herein.

Other aspects and advantages of the present technology can be seen on review of the drawings, the detailed description and the claims, which follow.

BRIEF DESCRIPTION OF THE DRAWINGS

The present technology will be understood more fully from the detailed description given below and from the accompanying figures of embodiments thereof. The figures are used to provide knowledge and understanding of embodiments of the present technology and do not limit the scope thereof to these specific embodiments. Furthermore, the figures are not necessarily drawn to scale.

FIG. 3A illustrates an example of 2 routing groups.

FIG. 3B illustrates an example of bundle routing results for routing groups of FIG. 3A.

FIG. 16 illustrates Table 1, Table 2, and Table 3.

DETAILED DESCRIPTION

Figure 1:
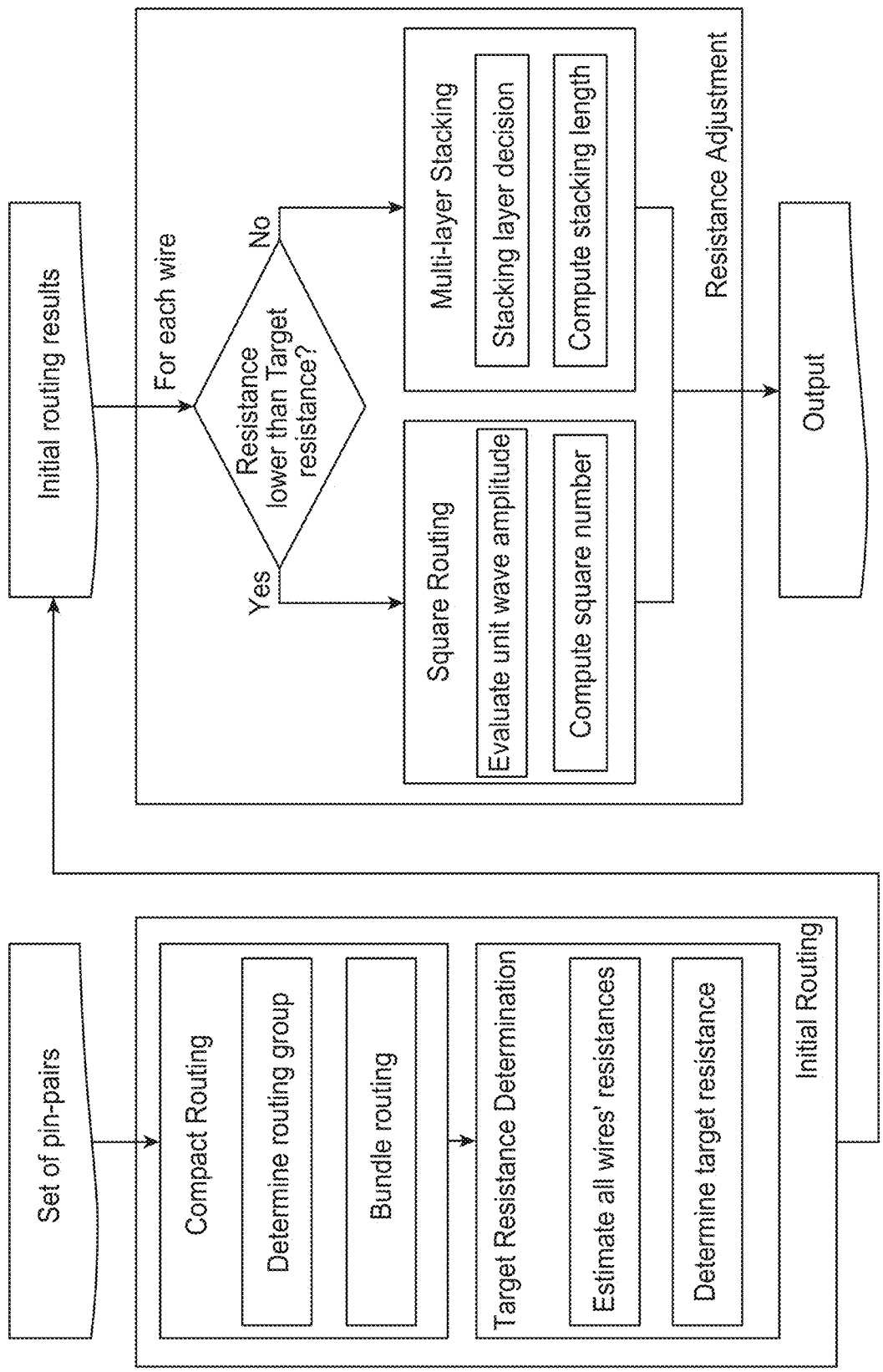
FIG. 1 illustrates automated and equal-resistance routing flow.

Aspects of the present technology relate to automatically generating equal-resistance routing in compact patterns. In certain integrated circuit (IC) designs, the function of the integrated circuit may depend upon the lengths of certain wires or connections of the IC design. An example of such an IC design includes, but is not limited to, a display driver integrated circuit (Driver IC) of a flat-panel display (FPD). The FPD is an electronic display device that includes a two-dimensional array of individual pixels. The brightness of a pixel to be displayed is based on the voltage delivered by the Driver IC. For balancing the brightness of the whole screen of the FPD (e.g., the entire two-dimensional array of pixels), it is desirable that the voltage each pixel receives be equal or approximately equal to that of other pixels. However, if the wire lengths between the Display Driver IC and various pixels are different, then the voltage drops across the wires will also be different, causing a difference of input voltage to each pixel. As a result, the brightness of the pixels may be unbalanced. Although the present disclosure describes an FPD or Display Driver IC, the operations herein may be used with other integrated circuit designs.

Conventionally, to generate equal-resistance routing results, IC designers may need to create an initial routing result of an IC design at first and then adjust the resistance of each wire of the IC design respectively. However, equal-resistance routing may fail due to the routing resources not being preserved if wires from the initial routing results are not as compact as possible. Without enough routing resources, it is hard to route all connections successfully. Additionally, IC designers may need to adjust all wires one by one to ensure that the wire resistances are as equal as possible, which can take a significant amount of time and several iterations during the IC design process, particularly for integrated circuit designs with a large number of wires.

In the present disclosure, a routing flow to complete all connections of an integrated circuit design automatically with equal-resistance is provided. In some embodiments, the routing flow may complete the connections with approximately equal-resistance. For example, resistances of connections or wires may be within a threshold percentage or threshold resistance with respect to each other. The resistances may be considered equal-based if the resistances correspond to each other or are of similar resistance values. In an example routing flow, connected wires between the Display Driver IC (or another point in the IC design) and pixels (or another point in the IC design) are compacted with one another to significantly preserve the routing resources. Further, automatically routing these connections can crucially improve the routing performance compared with conventional techniques (e.g., routing by hand). Moreover, computing each wire during the routing flow can be more accurate for adjusting resistance. As a result, less computing resources may be used to route the wires of the IC design and the resulting IC design may be improved.

The overall flow of the automated and equal-resistance routing is summarized in FIG. 1. The routing flow is divided into two parts: initial routing and resistance adjustment. In initial routing, the connected wire between each pin-pair, which views the voltage source from Display Driver IC and its corresponding pixel as two pins, is routed compactly and evaluated sequentially. Besides, the target resistance can be estimated during the initial routing. After initial routing, resistance adjustment is applied to adjust wire resistance respectively. In this stage, two adjusting methods: square routing and multi-layer stacking are provided. The former is adopted to increase wire resistance and the latter is the opposite. The details of each phase are explained in the following sections.

Figure 2:
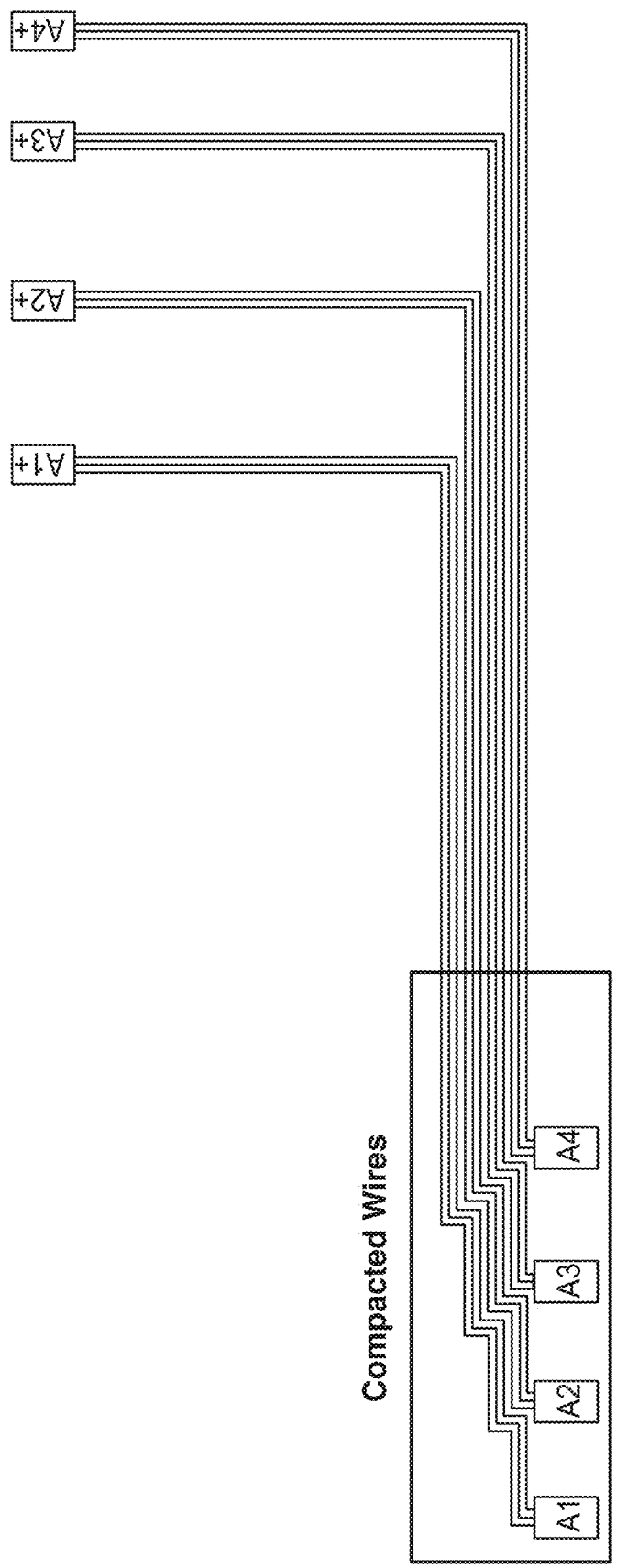
FIG. 2 illustrates an example of compact routing.

In this phase, the initial routing wire between each pin-pair is generated. To accurately reserve the routing resources for the resistance adjustment, a compact routing method is desired. FIG. 2 is an example of compact routing. In this example, wires are compacted and routed in a consistent pattern. Grouping is also necessary for determining which wires should be in the same routing pattern. In FIG. 3A, these wires can be partitioned into two groups, and then the wires in the same group are routed in bundles, as shown in FIG. 3B. Bundle routing can guarantee wires of this group routed in the same pattern.

After routing the pin-pairs compactly, the resistance of each wire is computed sequentially. These computations can help to determine the target resistance, which facilitates generating the equal-resistance routing. If the maximum wire resistance is chosen as target resistance, other wires will increase their resistances for approaching the target. On the other hand, if the minimum resistance is adopted, other wires will decrease their resistances relatively.

With initial routing results and the target resistance, all wires can be revised to be equal to the target resistance one by one. When these wires are adjusted, there are two methods, square routing and multi-layer stacking, applied for different situations.

Figure 4B:
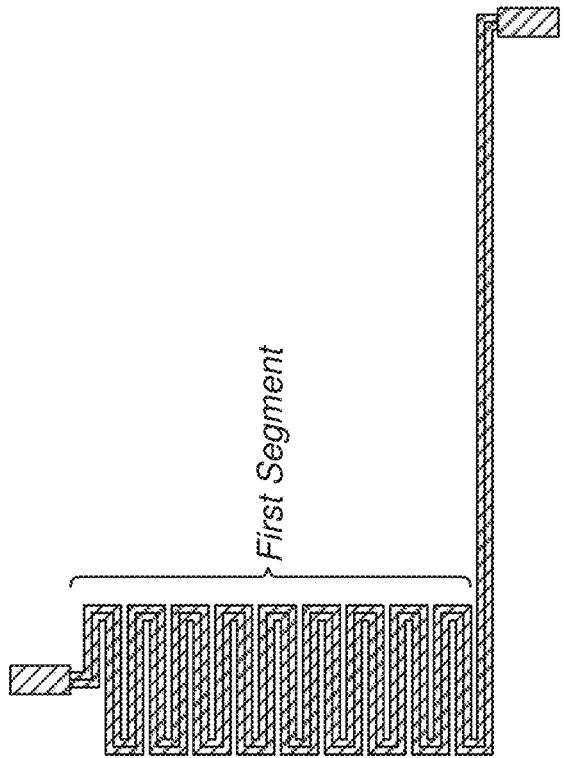
FIG. 4B illustrates the example first segment of the wire in FIG. 4A after square wave style routing has been applied.
Figure 4A:
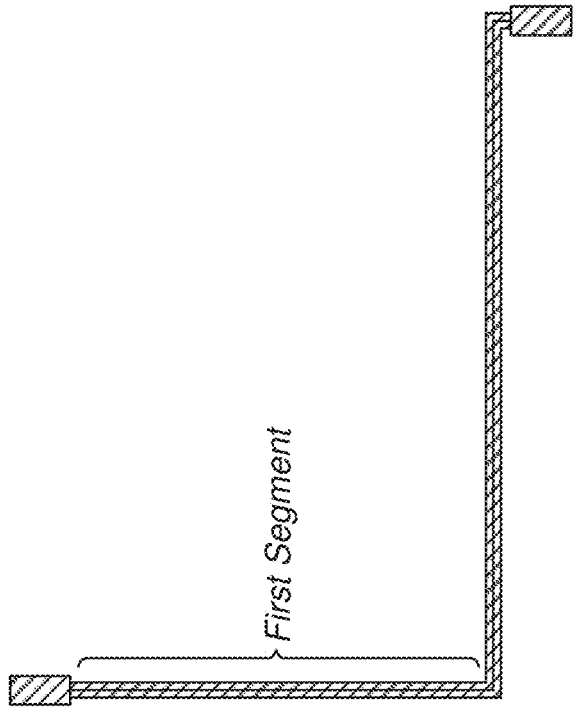
FIG. 4A illustrates an example of a first segment of a wire before square wave style routing is applied, in which a first segment will be routed like a square wave to extend itself.
Figure 5:
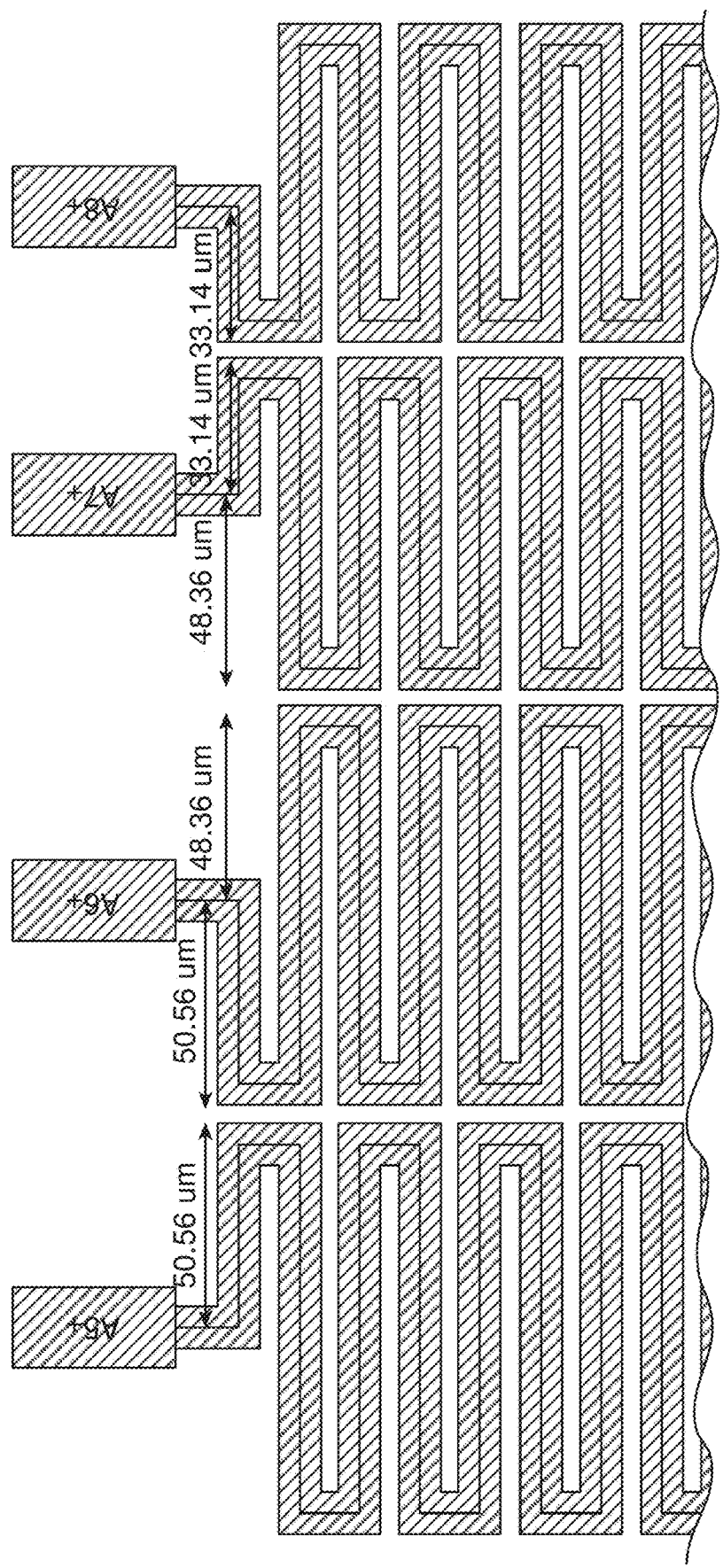
FIG. 5 illustrates an example of determining amplitudes.

If a wire is adjusted in the square routing method, its first segment will be routed like a square wave to extend itself, as shown in FIG. 4A, depicting the first segment before square wave style routing is applied and FIG. 4B, depicting the first segment after square wave style routing has been applied. Following this routing pattern can help to increase resistance significantly. For avoiding overlapping with other wires and reserving more area for other wires to do square routing, the amplitude of the unit square wave should be determined accurately. FIG. 5 shows an example of how to determine the amplitude of the unit square wave for each wire. In this example, the present disclosure may involve computing the distance between adjacent wires and then set the median of distance as amplitude.

Figure 6:
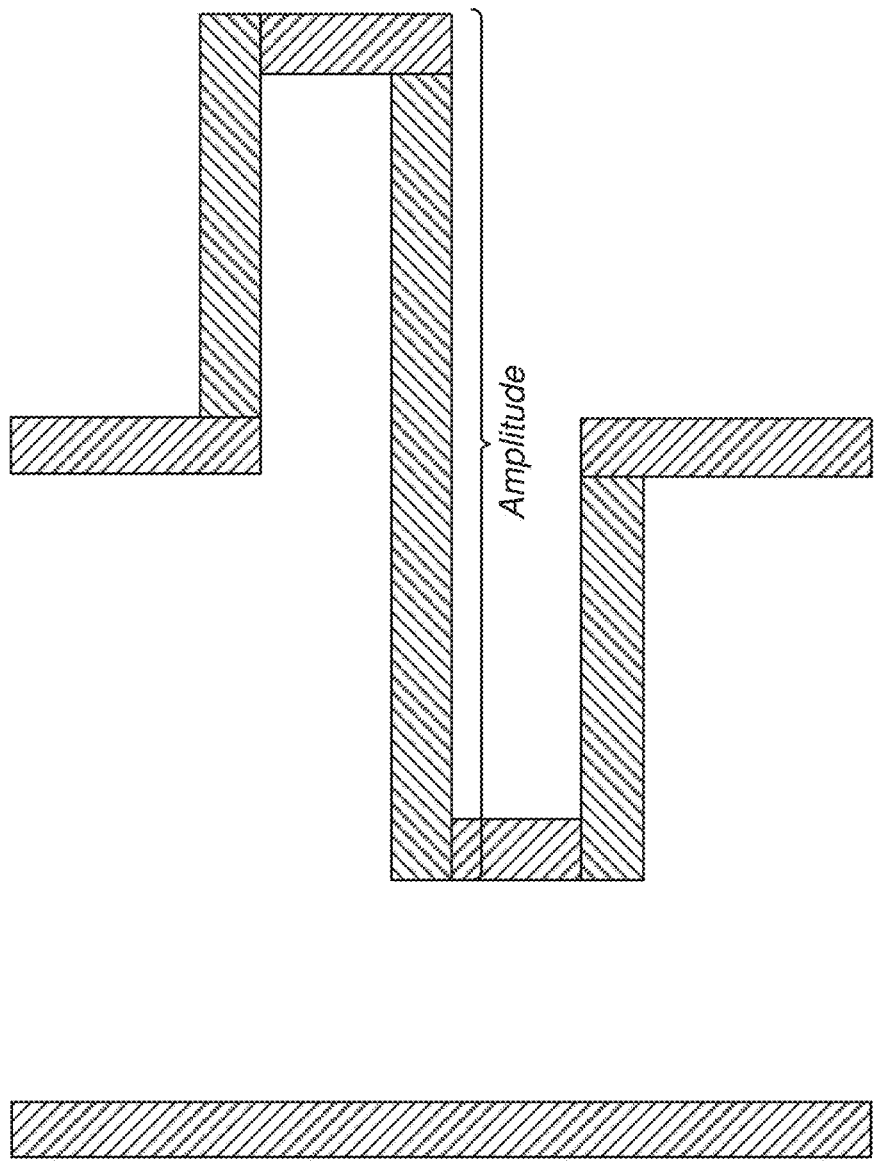
FIG. 6A illustrates an initial routing wire.
FIG. 6B illustrates a unit square wave in which the green segments are increments.

After determining the unit wave amplitude of the current wire, the incremental resistance of a unit square wave can be obtained by computing the length of its amplitudes, as shown in FIGS. 6A and 6B. With the target resistance and the resistance of a current wire, and resistance of each unit, the following function can be used to compute the unit number, which means the number of units of square wave are needed.

$$\text{UnitNumber} = \frac{R_{Target} - R_{Wire}}{R_{Unit}} \quad (1)$$

Figure 7:
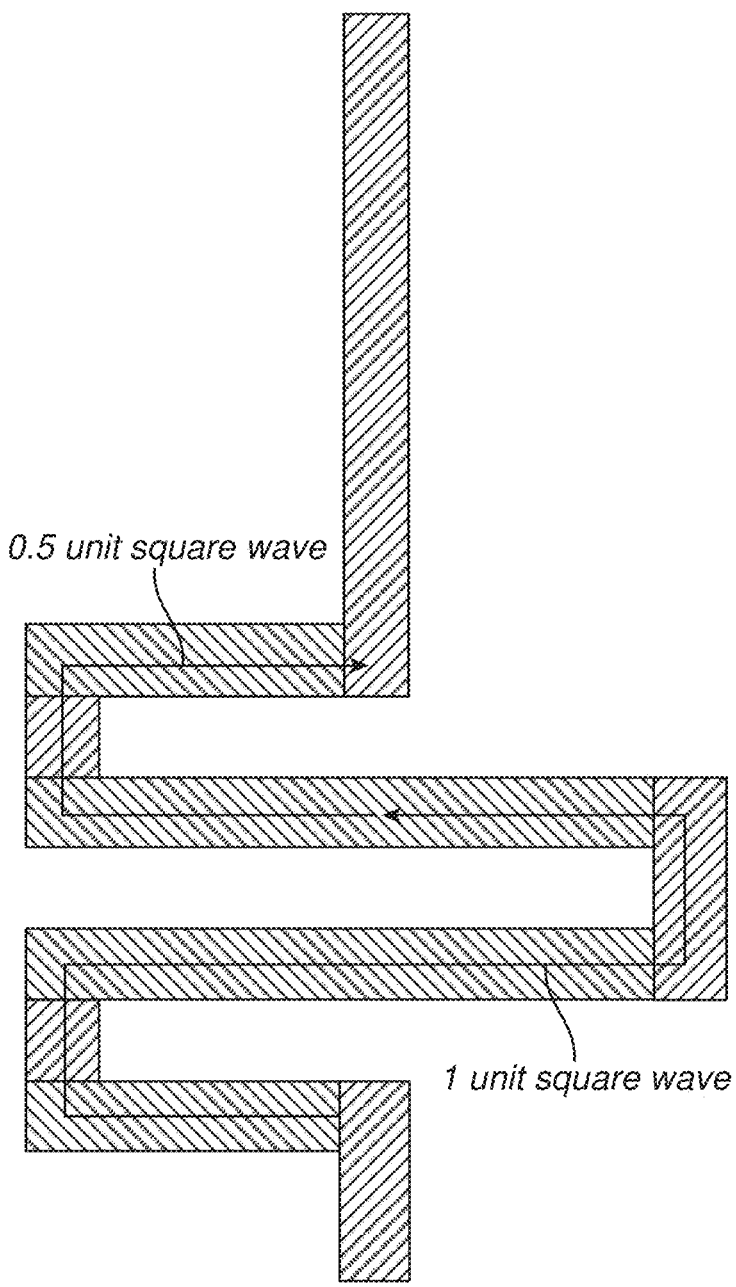
FIG. 7 illustrates adding a square wave with one and a half of amplitude.

In Equation (1), UnitNumber is the number of unit square wave needed by the current wire. $R_{Target}$ is the target resistance and $R_{Wire}$ is the resistance of the current wire. $R_{Unit}$ is the incremental resistance of a unit square wave, determined from the amplitude and the resistance of the wire. Because the UnitNumber may not be an integer number, an additional square wave with the specific amplitude is needed to achieve the equal-resistance. FIG. 7 shows an example of adding a square wave with a half of amplitude to approach the target resistance.

Figure 8:
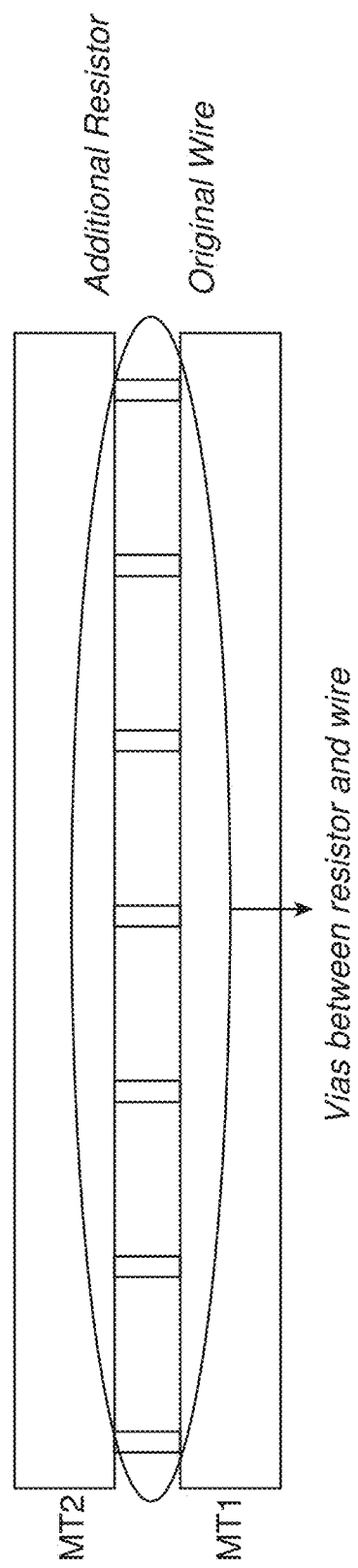
FIG. 8 illustrates an example of the wire covered by additional resistor in vertical view.

In contrast to the square routing method, multi-layer stacking is applied to decrease the wire resistance. The present disclosure can effectively lower the wire resistance if directly stacking the resistors composed of other routing layers onto this wire. Stacking the wire with other resistors can be viewed as connecting resistors in parallel using vias, decreasing the overall resistance at the same time. FIG. 8 shows a vertical view of a wire MT1 covered by an additional resistor MT2.

Figure 9A:
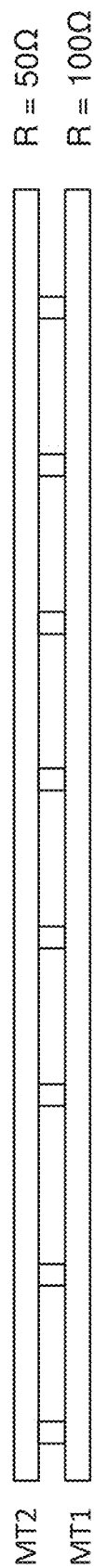
FIG. 9A illustrates vertical views of stacking layers results for an example of stacking in 2 layers, resistance=33.34Ω.
Figure 9B:
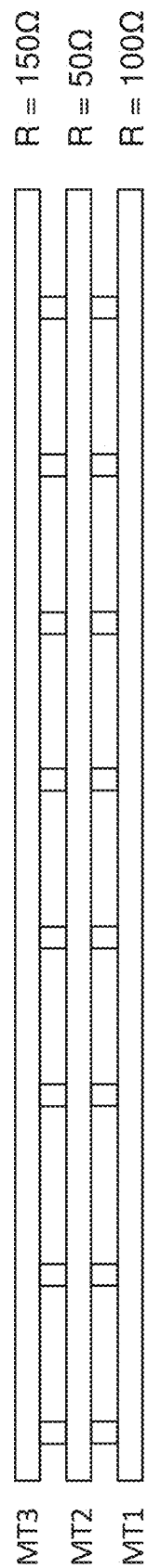
FIG. 9B illustrates vertical views of stacking layers results for an example of stacking in 3 layers, resistance=27.27Ω.

Before generating the additional resistors, determining how many metal layers are usable is necessary for stacking the wire. The more the layers are stacked, the less resistance of each wire is. FIGS. 9A and 9B demonstrate how effectivity of stacking more additional resistors (e.g., layers MT2, MT3). Moreover, the sheet resistance of each stacking layer may be different, the chosen layers will also affect the total resistance significantly.

Figure 10:
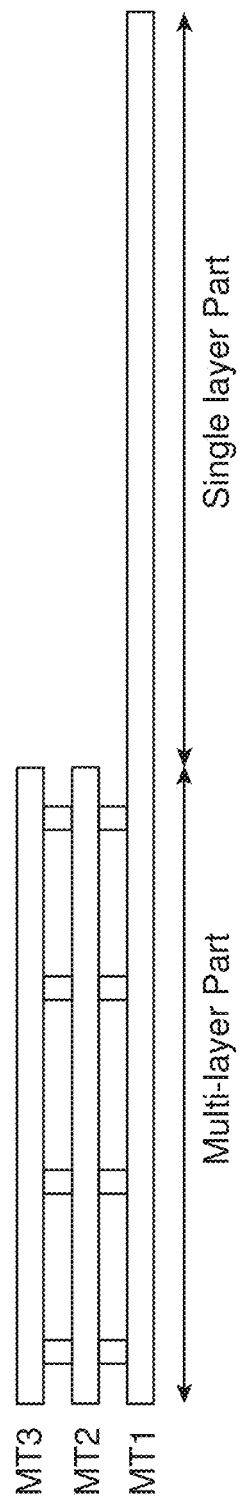
FIG. 10 illustrates multi-layer part connects to single layer part in series in vertical view.

After determining the stacking layers, the resistors can be adjusted to approach the target resistance. As shown in FIG. 10, the wire MT1 is composed of the multi-layer part and single layer part. And these two parts can be viewed as two resistors connected in series. Changing the length of the multi-layer part and the length of the single layer part can help to approach the target resistance effectively.

Figure 11:
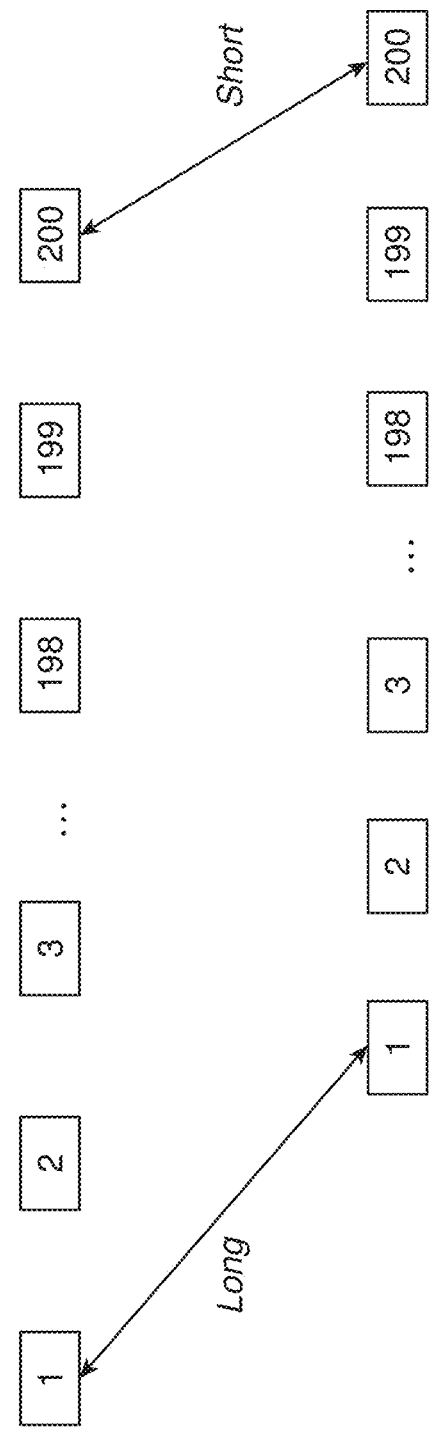
FIG. 11 illustrates a case with 200 pin-pairs.
Figure 12A:
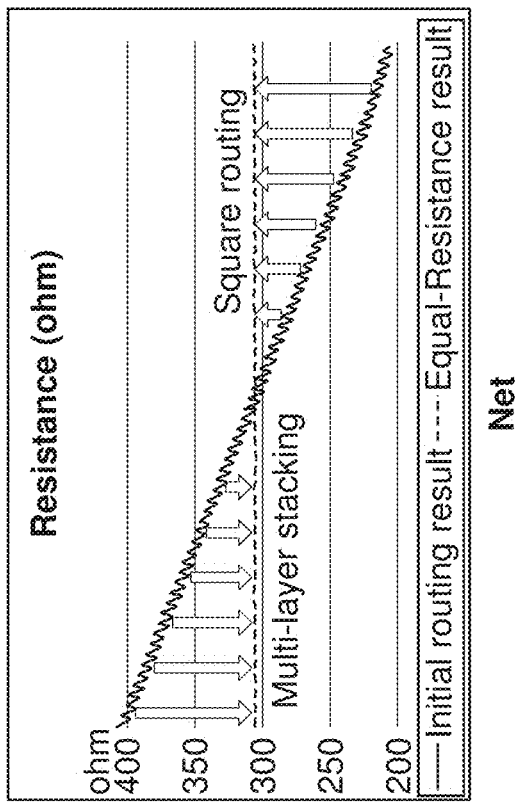
FIG. 12A illustrates the evaluation of the initial routing result of the case in FIG. 11.

To demonstrate how the routing flow effectively adjusts wires' resistances as equal as possible, this technology is applied to a case containing 200 pin-pairs, as shown in FIG. 11. In this case, the distance between the leftmost pin-pair is much further than the distance between the rightmost pin-pair, which means the length of the wire connecting the leftmost pin-pair will be longer than the connecting wire of the rightmost pair. Based on these pin-pair placements, an initial routing result is generated and the resistance per wire evaluated. The evaluation of the initial routing result is shown in FIG. 12A. The target resistance can also be determined for achieving equal-resistance. Here the present technology applies the median of the leftmost wire's resistance and rightmost wire's resistance as target resistance (the dashed line in FIG. 12A). Selecting (e.g., via user input) a different target resistance will change combination of techniques selected for the solution.

Figure 12B:
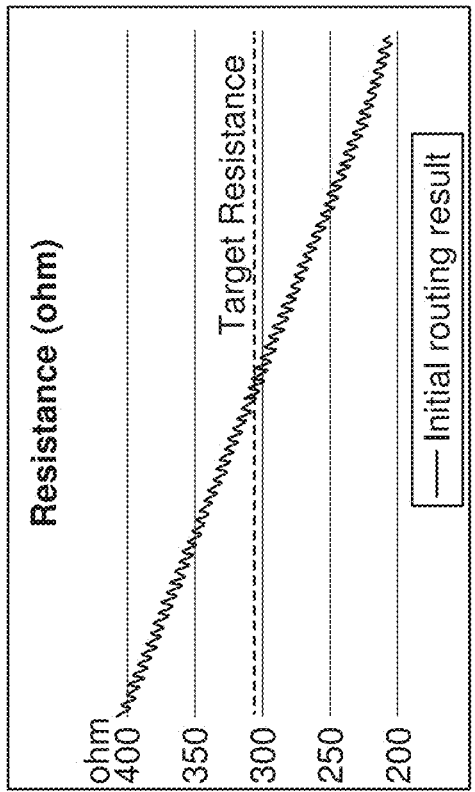
FIG. 12B illustrates the evaluation of the adjustments based on the initial routing result of the case in FIG. 11.

After determining the target resistance, the present technology includes starting the adjusting all wires' resistances by two methods—square routing and multi-layer stacking to increase or decrease the wire's resistance sequentially. When adjusting the wires with fewer resistances, such as the wires close to the rightmost wire, the proposed routing flow will apply the square routing method to extend wires and increase their resistances. On the other hand, for handling the wires close to the leftmost wire, which means their resistances are larger than target resistance, applying the multi-stacking method can effectively decrease the wires' resistances. FIG. 12B proves that all wires' resistances are approaching the target resistance.

Figure 13:
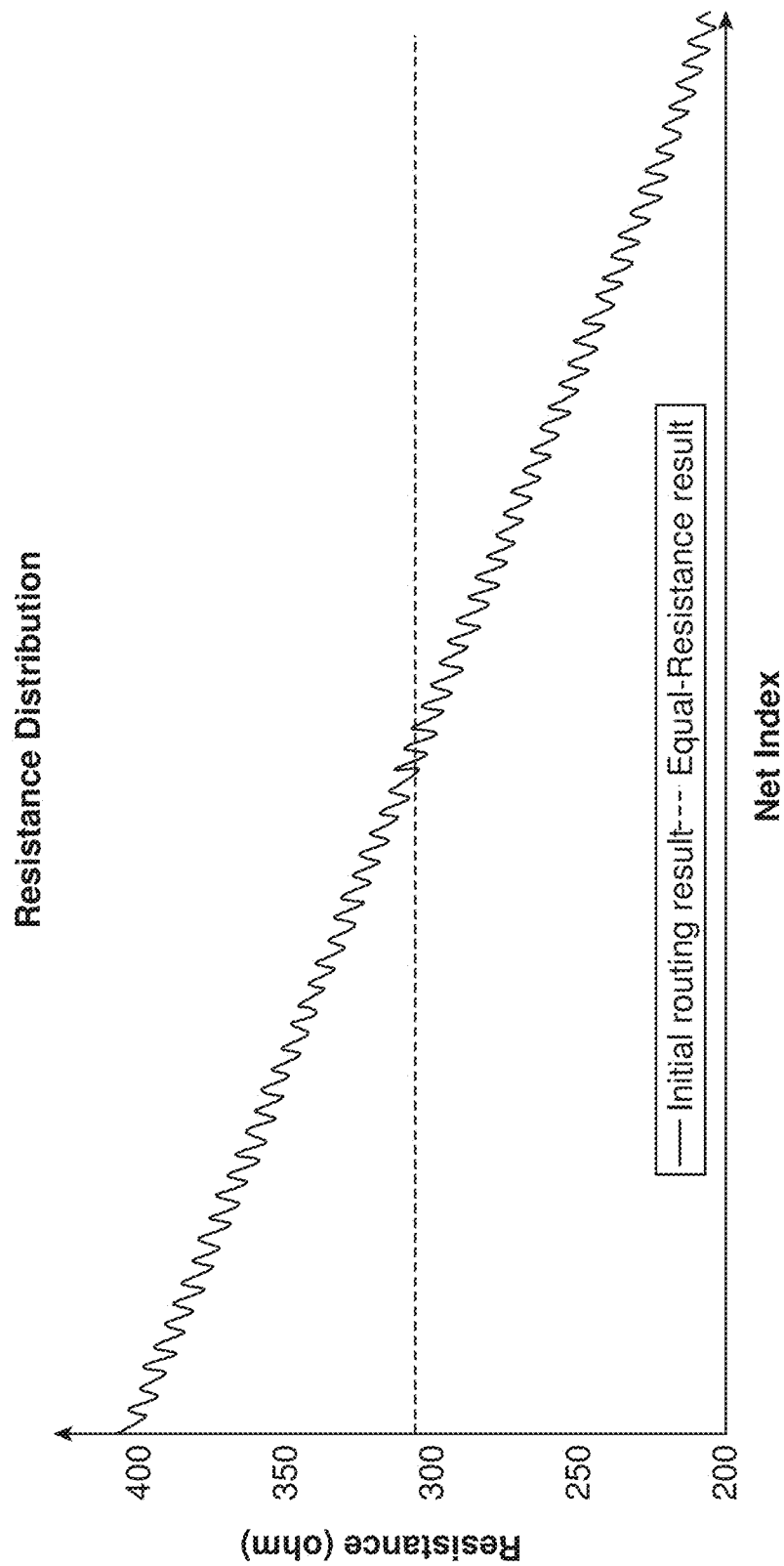
FIG. 13 illustrates Case1 Resistance report.
Figure 14:
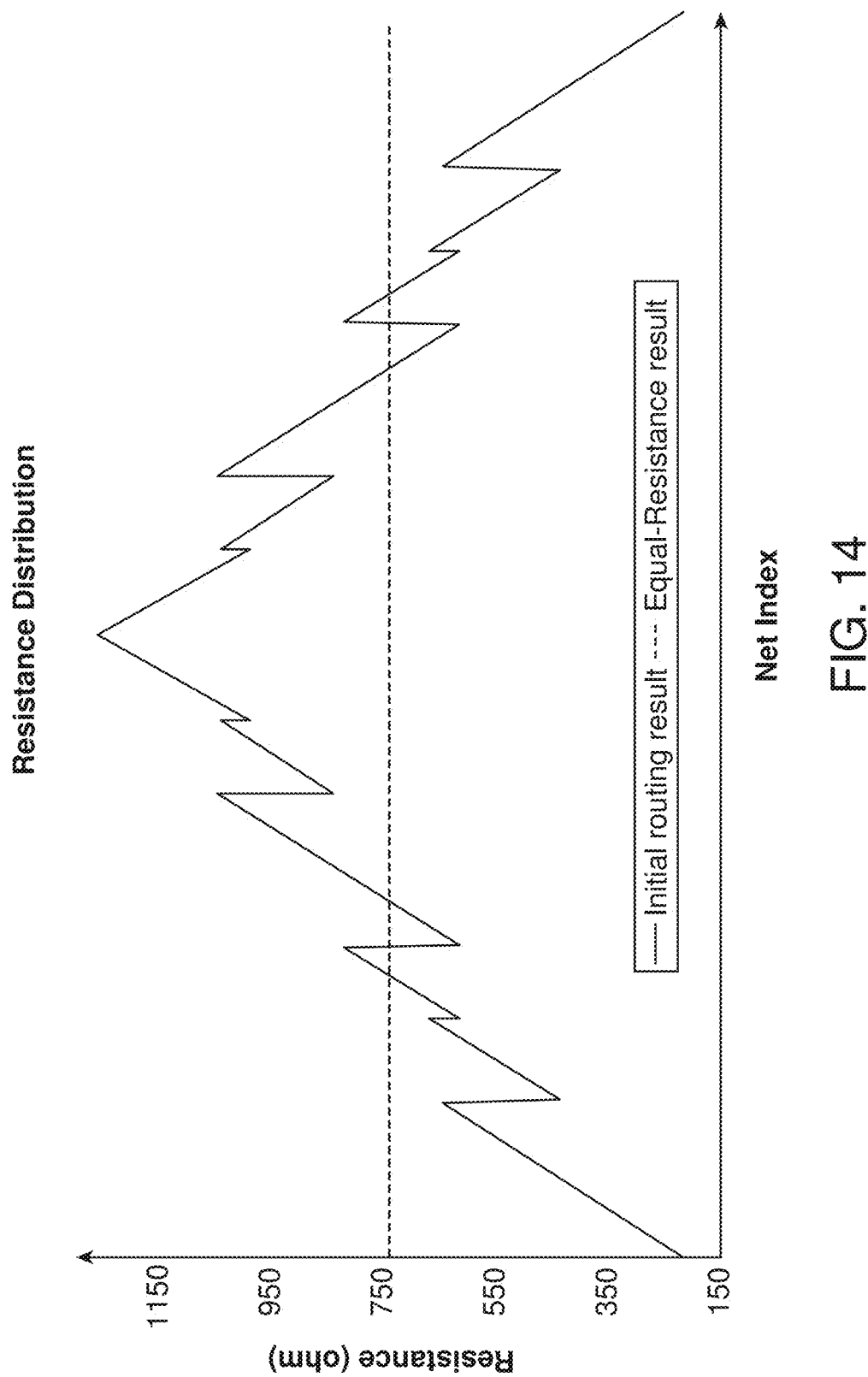
FIG. 14 illustrates Case2 Resistance report.
Figure 15:
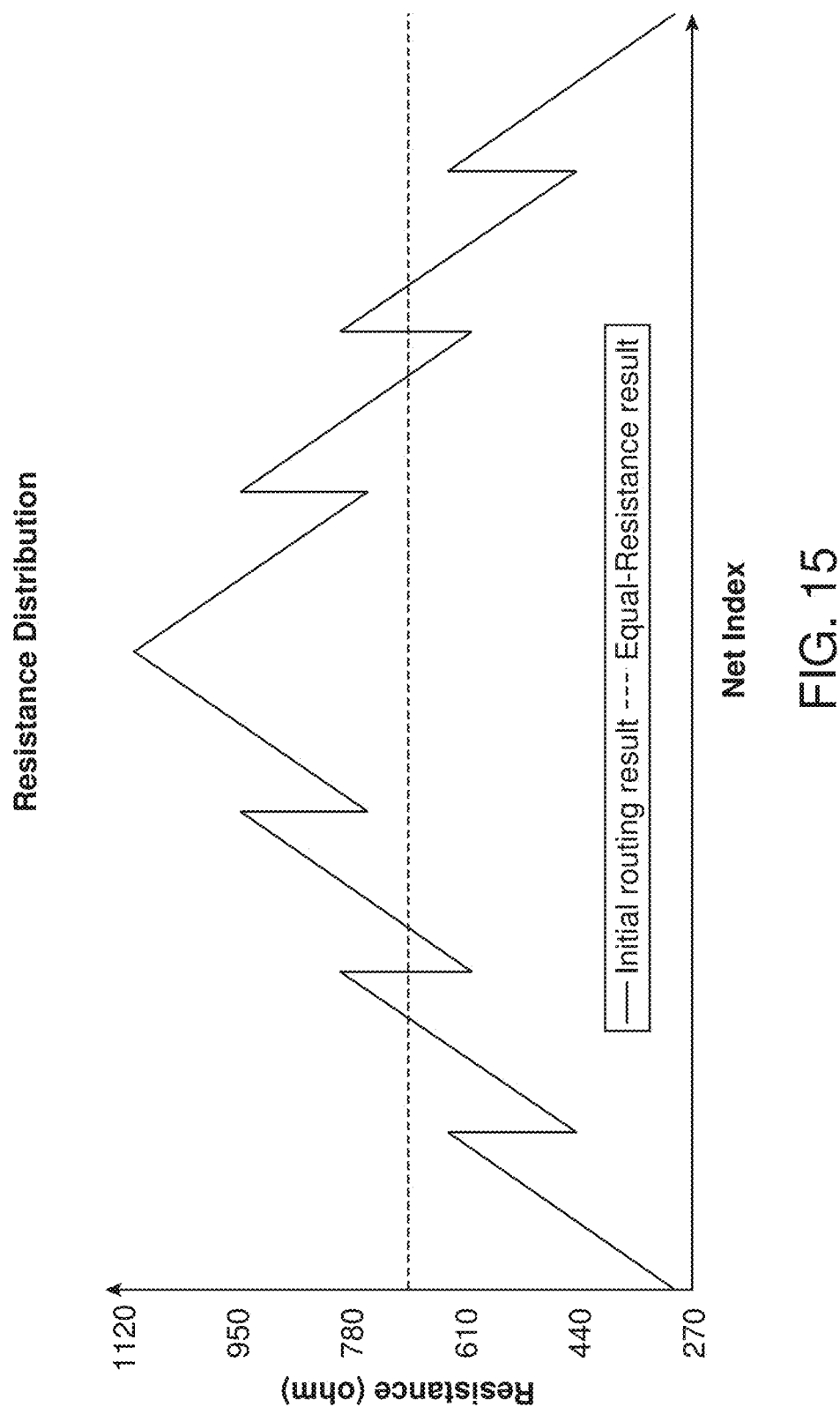
FIG. 15 illustrates Case3 Resistance report.

Now with reference to FIG. 16, with this embodiment, three benchmarks are applied to validate our routing flow. These benchmarks are comprised of numerous pin-pairs. The detailed information of routing layers and their sheet resistances are in Table 1. The detailed information of each benchmark is summarized in Table 2. During the simulation, the median of maximum resistance and minimum resistance of each initial routing result is adopted, routed in a single metal layer and compact routing method, as the target resistance for each case. And the information about target resistances is also described in Table 2. Table 3 shows the result by proposed routing flow of each benchmark. In this simulation, three layers have been applied to demonstrate the effect of multi-layer stacking, and all pin-pairs in each benchmark are routed successfully. The equal-resistance routing result can be compared with the initial routing results. The comparison, can indicate the magnitude of improvement after applying the equal-resistance routing flow, of each benchmark can be found (FIG. 13-FIG. 15). The simulation results show the proposed routing flow achieving comprehensive equal-resistance even in a massive number of pin-pairs.

Figure 17:
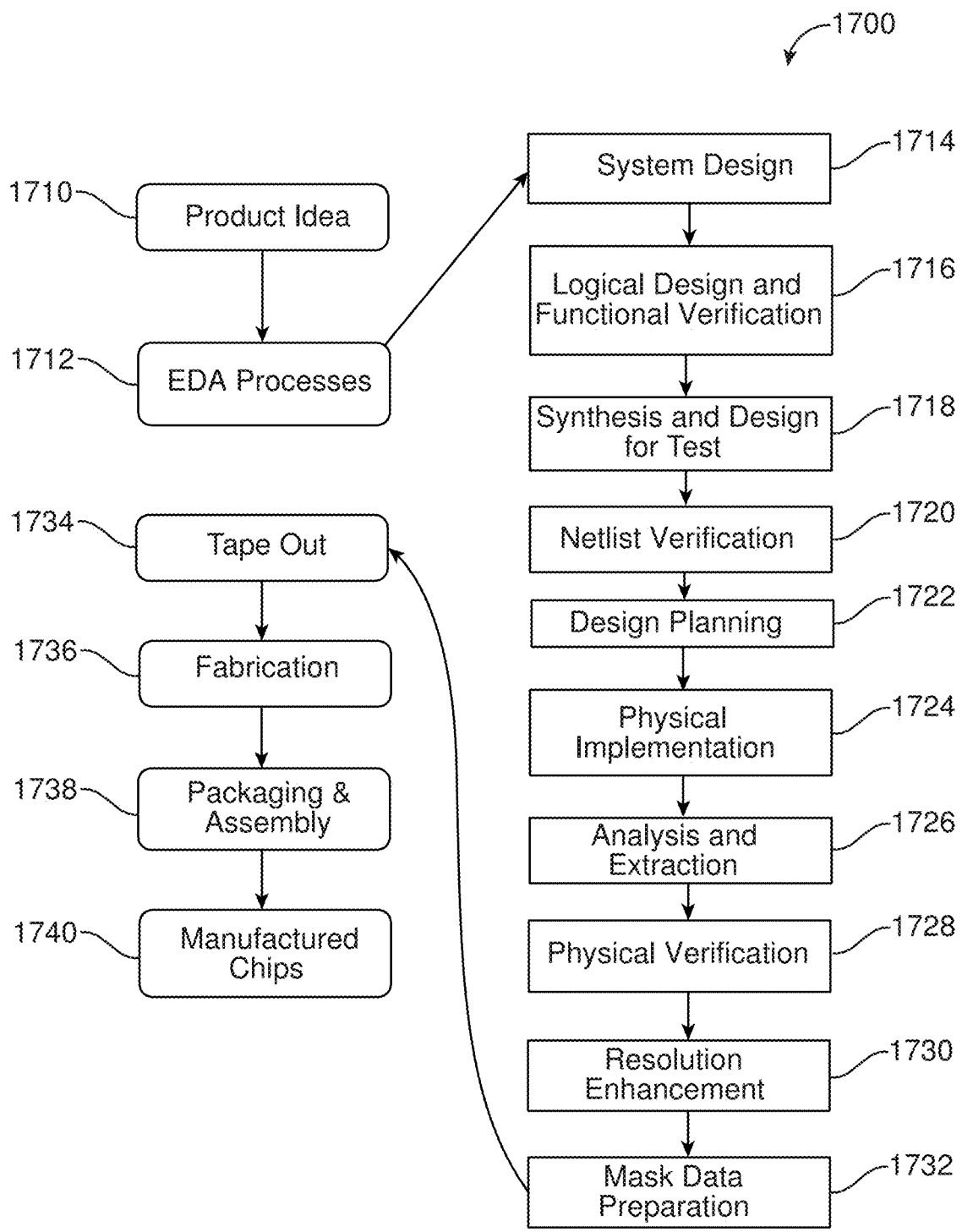
FIG. 17 depicts a flowchart of various processes used during the design and manufacture of an integrated circuit in accordance with some embodiments of the present technology.

FIG. 17 illustrates an example set of processes 1700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1710 with information supplied by a designer, information which is transformed to create an article of manufacture that uses a set of EDA processes 1712. When the design is finalized, the design is taped-out 1734, which is when artwork (e.g., geometric patterns) for the integrated circuit is sent to a fabrication facility to manufacture the mask set, which is then used to manufacture the integrated circuit. After tape-out, a semiconductor die is fabricated 1736 and packaging and assembly processes 1738 are performed to produce the finished integrated circuit 1740.

Specifications for a circuit or electronic structure may range from low-level transistor material layouts to high-level description languages. A high-level of modelling may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level of modelling adds more useful detail into the design description, for example, more details for the modules, including processors and executable code that include the description. The lower levels of the model can be generated by a computer, derived from a design library, or created by another design automation process. An example of a specification language at a lower level of modelling or design language for specifying more detailed descriptions is SPICE, which is used for detailed descriptions of circuits with many analog components. Descriptions at each level of modelling are enabled for use by the corresponding tools of that layer (e.g., a formal verification tool). A design process may use a sequence depicted in FIG. 17. The processes described by be enabled by EDA products (or tools).

During system design 1714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1720, the netlist is checked for compliance with timing constraints and for correspondence with the HDL code. During design planning 1722, an overall floor plan for the integrated circuit is constructed and analyzed for timing and top-level routing.

During layout or physical implementation 1724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1726, the circuit function is verified at the layout level, which permits refinement of the layout design. During physical verification 1728, the layout design is checked to ensure that manufacturing constraints are correct, such as DRC constraints, electrical constraints, lithographic constraints, and that circuitry function matches the HDL design specification. During resolution enhancement 1730, the geometry of the layout is transformed to improve how the circuit design is manufactured.

During tape-out, data is created to be used (after lithographic enhancements are applied if appropriate) for production of lithography masks. During mask data preparation 1732, the 'tape-out' data is used to produce lithography masks that are used to produce finished integrated circuits.

A storage subsystem of a computer system (such as computer system 1900 of FIG. 19, or host system 1807 of FIG. 18) may be used to store the programs and data structures that are used by some or all of the EDA products described herein, and products used for development of cells for the library and for physical and logical design that use the library.

Figure 18:
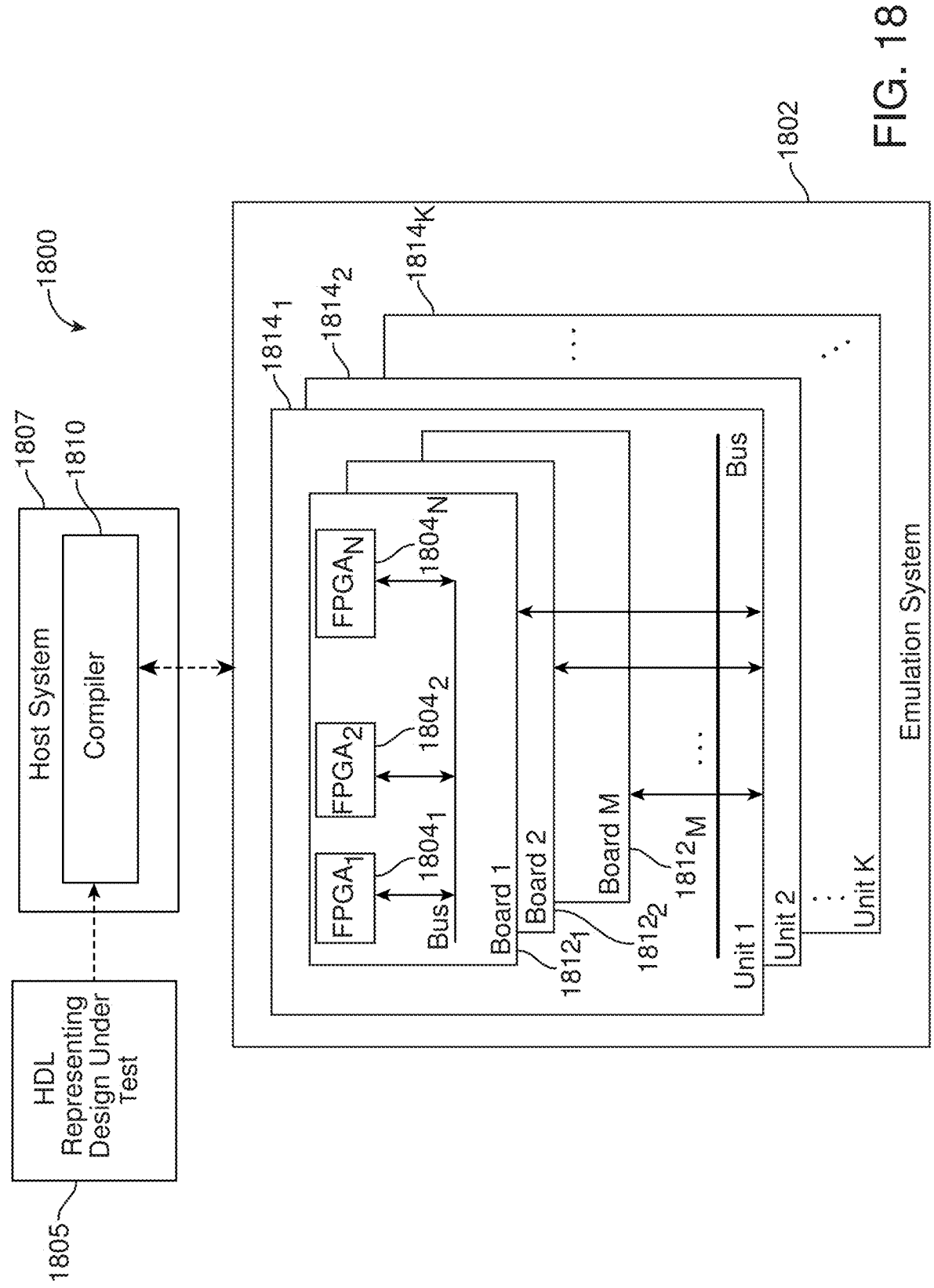
FIG. 18 depicts an architectural level diagram of an example emulation system in accordance with some embodiments of the present technology.

FIG. 18 depicts an architectural level diagram of an example emulation environment 1800. An emulation environment 1800 may be configured to verify the functionality of the circuit design. The emulation environment 1800 may include a host system 1807 (e.g., a computer that is part of an EDA system) and an emulation system 1802 (e.g., a set of programmable devices such as Field Programmable Gate Arrays (FPGAs) or processors). The host system generates data and information by using a compiler 1810 to structure the emulation system to emulate a circuit design. A circuit design to be emulated is also referred to as a Design Under Test ('DUT') where data and information from the emulation are used to verify the functionality of the DUT.

The host system 1807 may include one or more processors. In the embodiment where the host system includes multiple processors, the functions described herein as being performed by the host system can be distributed among the multiple processors. The host system 1807 may include a compiler 1810 to transform specifications written in a description language that represents a DUT and to produce data (e.g., binary data) and information that is used to structure the emulation system 1802 to emulate the DUT. The compiler 1810 can transform, change, restructure, add new functions to, and/or control the timing of the DUT.

The host system 1807 and emulation system 1802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1807 and emulation system 1802 can exchange data and information through a third device such as a network server.

The emulation system 1802 includes multiple FPGAs (or other modules) such as FPGAs 1804₁ and 1804₂ as well as additional FPGAs to 1804_N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 1804₁-1804_N may be placed onto one or more boards 1812₁ and 1812₂ as well as additional boards through 1812_M. Multiple boards can be placed into an emulation unit 1814₁. The boards within an emulation unit can be connected using the backplane of the emulation unit or any other types of connections. In addition, multiple emulation units (e.g., 1814₁ and 1814₂ through 1814_K) can be connected to each other by cables or any other means to form a multi-emulation unit system.

For a DUT that is to be emulated, the host system 1807 transmits one or more bit files to the emulation system 1802. The bit files may specify a description of the DUT and may further specify partitions of the DUT created by the host system 1807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1807 and/or the compiler 1810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1805 into gate level logic. For a DUT that is to be emulated, the design synthesizer sub-system receives a description of the DUT. If the description of the DUT is fully or partially in HDL (e.g., RTL or other level of modelling), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 19:
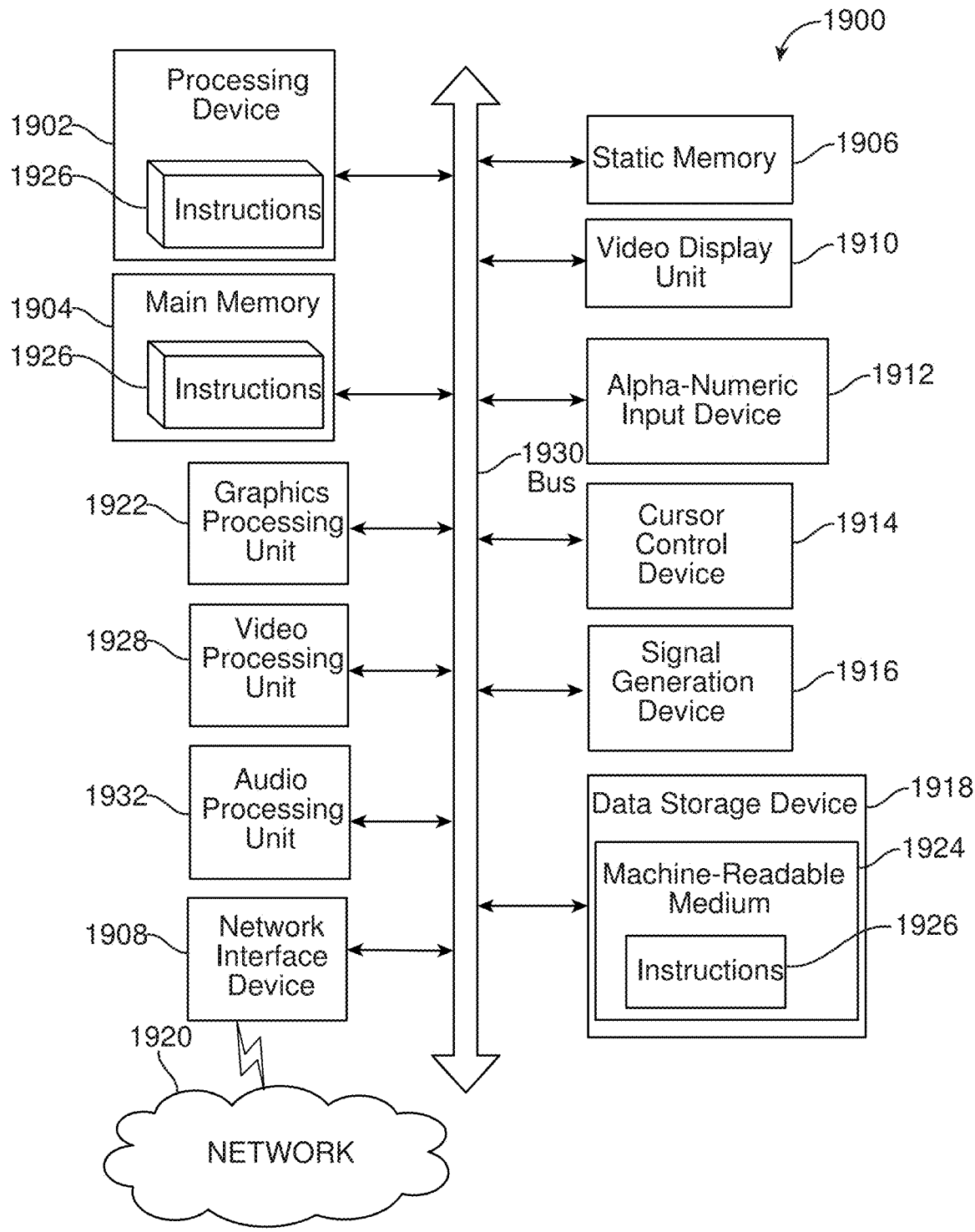
FIG. 19 depicts an architectural level diagram of an example computer system in which embodiments of the present technology may operate.

FIG. 19 illustrates an example machine of a computer system 1900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1900 includes a processing device 1902, a main memory 1904 (e.g., read-only memory (ROM), flash memory, dynamic random access memory (DRAM) such as synchronous DRAM (SDRAM), a static memory 1906 (e.g., flash memory, static random access memory (SRAM), etc.), and a data storage device 1918, which communicate with each other via a bus 1930.

Processing device 1902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. The processing device 1902 may be configured to execute instructions 1926 for performing the operations and steps described herein.

The computer system 1900 may further include a network interface device 1908 to communicate over the network 1920. The computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), a graphics processing unit 1922, a signal generation device 1916 (e.g., a speaker), graphics processing unit 1922, video processing unit 1928, and audio processing unit 1932.

The data storage device 1918 may include a machine-readable storage medium 1924 (also known as a non-transitory computer-readable medium) on which is stored one or more sets of instructions 1926 or software embodying any one or more of the methodologies or functions described herein. The instructions 1926 may also reside, completely or at least partially, within the main memory 1904 and/or within the processing device 1902 during execution thereof by the computer system 1900, the main memory 1904 and the processing device 1902 also constituting machine-readable storage media.

In some implementations, the instructions 1926 include instructions to implement functionality corresponding to the present technology. While the machine-readable storage medium 1924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1902 to perform any one or more of the methodologies of the present technology. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present technology, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present technology also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present technology is not described with reference to any particular programming language. It will be appreciated that a variety of programming languages may be used to implement the teachings as described herein.

The present technology may be provided as a computer program product, or software, that may include a machine-readable medium having stored thereon instructions, which may be used to program a computer system (or other electronic devices) to perform a process according to the present technology. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing, implementations of the present technology have been described with reference to specific example implementations thereof. It will be evident that various modifications may be made thereto without departing from the broader spirit and scope of implementations as set forth in the following claims. Where the text refers to some elements in the singular tense, more than one element can be depicted in the figures and like elements are labeled with like numerals. The description and drawings are, accordingly, to be regarded in an illustrative sense rather than a restrictive sense.

What is claimed is:

1. A method for generating a routing for an integrated circuit (IC) design, the method comprising:
    receiving information describing a set of pin-pairs of an integrated circuit (IC) design;
    determining, by a processor, an initial routing of the IC design by (i) defining connected wires between each pin-pair in the set of pin-pairs, and (ii) evaluating a target resistance for the pin-pair over the connected wires, wherein each connected wire is routed with other connected wires;
    determining, by the processor, after initial routing, a resistance adjustment to be applied to adjust wire resistance of the connected wires, the resistance adjustment being based on a square routing in response to a wire resistance being below the target resistance, and the resistance adjustment being based on a multi-layer stacking in response to the wire resistance being above the target resistance; and
    providing routing in patterns as generated by the initial routing and the resistance adjustment.

2. The method of claim 1, wherein determining an initial routing further includes compacting wires and routing wires in a consistent pattern by:
    determining which wires should be in a same routing pattern, thereby forming groups of wires to be routed into routing patterns;
    for each group, routing wires in the group in bundles, wherein each wire in a bundle is routed in a same pattern.

3. The method of claim 2, wherein routing groups are determined by a position of a start pin and an end pins.

4. The method of claim 1, wherein determining a square routing further includes routing a first segment according to a square wave pattern by:
    determining an amplitude of a unit square wave by:
        computing a distance between adjacent wires;
        determining a median of the distance computed; and
        providing the median as the amplitude; and
    obtaining an incremental resistance of the unit square wave by:
        computing a length of amplitudes of wires in the unit square wave;
        determining, from a target resistance $R_{Target}$ and a resistance of a wire $R_{Wire}$, and an incremental resistance of a unit square wave $R_{Unit}$, a unit number representing a number of units of square waves needed.

5. The method of claim 4, wherein determining a square routing further includes routing additional segments.

6. The method of claim 1, wherein determining a multi-layer stacking for a wire further includes:
    obtaining a quantity of metal layers needed for stacking the wire;
    forming a first resistor, comprised of metal layers of the quantity of metal layers as obtained and a second resistor comprised of a single layer, wherein the second resistor is connected in series to the first resistor; and
    adjusting at least a length of the first resistor and the second resistor to approach the target resistance.

7. The method of claim 6, further including determining a multi-layer stacking for additional wires in a same group with the wire.

8. The method of claim 6, wherein a number of connections between different layers is obtained using rules prompted for and received.

9. The method of claim 1, wherein a pin-pair include a voltage source from a display driver integrated circuit ("IC") and a corresponding pixel as two pins.

10. The method of claim 1, wherein text or shape (pin or rectangle) indicates what can be connected in a pin-pair.

11. A system comprising:
    a memory storing instructions; and
    a processor, coupled with the memory and to execute the instructions, the instructions when executed cause the processor to perform operations comprising:
    receiving information describing a set of pin-pairs of an integrated circuit (IC) design;
    determining an initial routing of the IC design by (i) defining connected wires between each pin-pair in the set of pin-pairs, and (ii) evaluating a target resistance for the pin-pair over the connected wires, wherein each connected wire is routed with other connected wires;
    determining after initial routing, a resistance adjustment to be applied to adjust wire resistance of the connected wires, the resistance adjustment being based on a square routing in response to a wire resistance being below the target resistance, and the resistance adjustment being based on a multi-layer stacking in response to the wire resistance being above the target resistance; and
    providing a routing in patterns as generated by the initial routing and the resistance adjustment.

12. The system of claim 11, wherein determining an initial routing further includes compacting wires and routing wires in a consistent pattern by:
   determining which wires should be in a same routing pattern, thereby forming groups of wires to be routed into routing patterns;
   for each group, routing wires in the group in bundles, wherein each wire in a bundle is routed in a same pattern.

13. The system of claim 12, wherein routing groups are determined by a position of a start pin and an end pin.

14. The system of claim 11, wherein determining a square routing further includes routing a first segment according to a square wave pattern by:
   determining an amplitude of a unit square wave by:
      computing a distance between adjacent wires;
      determining a median of the distance computed; and
      providing the median as the amplitude; and
   obtaining an incremental resistance of the unit square wave by:
      computing a length of amplitudes of wires in the unit square wave;
      determining, from a target resistance $R_{Target}$ and a resistance of a wire $R_{Wire}$, and an incremental resistance of a unit square wave $R_{Unit}$, a unit number representing a number of units of square waves needed.

15. The system of claim 14, wherein determining a square routing further includes routing additional segments.

16. The system of claim 11, wherein determining a multi-layer stacking for a wire further includes:
   obtaining a quantity of metal layers needed for stacking the wire;
   forming a first resistor, comprised of metal layers of the quantity of metal layers as obtained and a second resistor comprised of a single layer, wherein the second resistor is connected in series to the first resistor; and
   adjusting at least a length of the first resistor and the second resistor to approach the target resistance.

17. The system of claim 16, further including determining a multi-layer stacking for additional wires in a same group with the wire.

18. The system of claim 16, wherein a number of connections between different layers is obtained using rules prompted for and received.

19. The system of claim 11, wherein a pin-pair includes a voltage source from a display driver integrated circuit ("IC") and a corresponding pixel as two pins.

20. A non-transitory computer readable medium comprising stored instructions, which when executed by a processor, cause the processor to perform operations comprising:
   receiving information describing a set of pin-pairs of an integrated circuit (IC) design;
   determining an initial routing of the IC design including (i) defining connected wires between each pin-pair in the set of pin-pairs, and (ii) evaluating a target resistance for the pin-pair over the connected wires, wherein each connected wire is routed compactly with other connected wires and wire resistances are evaluated sequentially;
   determining after initial routing, a resistance adjustment to be applied to adjust wire resistance, further comprising:
      determining whether the wire resistance is below the target resistance, and whenever the wire resistance is below the target resistance:
         determining a square routing;
      otherwise determining whether the wire resistance is above the target resistance, and whenever the wire resistance is above the target resistance:
         determining a multi-layer stacking; and
   providing the routing in compact patterns as generated by the initial routing and as adjusted by the resistance adjustment.

* * * * *